(12) United States Patent
Rückert et al.

(10) Patent No.: US 6,530,293 B1
(45) Date of Patent: Mar. 11, 2003

(54) SHIFT MECHANISM FOR MOTOR VEHICLE TRANSMISSIONS

(75) Inventors: Dieter Rückert, Reilingen (DE); Jörg Jens Höfle, Jugenheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/571,245

(22) Filed: May 16, 2000

(30) Foreign Application Priority Data

May 29, 1999 (DE) .......................................... 199 24 791

(51) Int. Cl.[7] .......................... F16H 59/08; B60K 20/00
(52) U.S. Cl. ............................... 74/473.12; 74/473.33; 74/471 XY; 324/207.23
(58) Field of Search ...................... 74/473.33, 471 XY, 74/473.12, 335; 340/456; 324/207.2, 207.23–207.24, 207.25

(56) References Cited

U.S. PATENT DOCUMENTS

| 4,022,078 | A | | 5/1977 | Malott |
| 4,116,086 | A | | 9/1978 | Langford et al. |
| 4,519,266 | A | * | 5/1985 | Reinecke ............... 74/471 XY |
| 4,912,997 | A | * | 4/1990 | Malcolm et al. ............... 74/335 |
| 5,243,871 | A | * | 9/1993 | Weiten ......................... 74/335 |
| 5,277,077 | A | | 1/1994 | Osborn |
| 5,351,570 | A | | 10/1994 | Mizunuma et al. |
| 5,406,860 | A | | 4/1995 | Easton et al. |
| 5,809,835 | A | * | 9/1998 | Beim et al. .................... 74/335 |
| 6,155,128 | A | * | 12/2000 | Ersoy et al. ................... 74/340 |

FOREIGN PATENT DOCUMENTS

| EP | 0 620 385 | 10/1994 |
| JP | 0 784 169 A2 | 7/1997 |
| WO | WO 99 11951 | 3/1999 |

* cited by examiner

Primary Examiner—Willaim C Joyce

(57) ABSTRACT

A shift mechanism for motor vehicle transmissions having a selector lever (14) supported in bearings in a housing (10) that can be pivoted about a transverse axle (24) in longitudinal direction and about a longitudinal axle (50) in the transverse direction. At the selector lever (14) or at components (26, 82) moving with the selector lever (14) on the one hand and on components (96, 100) fixed to the housing on the other hand, position indicating elements (128, 130) or sensors (102–114, 120–126) are arranged in such a way that the sensors (102–114, 120–126) respond upon the approach to position indicating elements (128, 130) and transmit signals to a transmission control arrangement corresponding to the pivoted position of the selector lever (14). In order to make possible an automatic detection of the position of the selector lever (14) during any desired movement in the longitudinal and transverse directions, the position indicating elements (128, 130) and the sensors (102–114, 120–126) are arranged essentially in planes that are approximately parallel to the planes established by the pivoting path of the selector lever in the longitudinal direction and by the pivoting path of the selector lever in the transverse direction.

14 Claims, 3 Drawing Sheets

SHIFT MECHANISM FOR MOTOR VEHICLE TRANSMISSIONS

BACKGROUND AND SUMMARY OF THE INVENTION

The invention concerns a shift mechanism for motor vehicle transmissions with a selector lever supported in bearings in a housing, that can be pivoted about a longitudinal axle in the transverse direction and about a transverse axle in the longitudinal direction. Position indicating elements or sensors are arranged at the selector lever or at components moving with the selector lever on the one hand, and at components fixed to the housing on the other hand, in such a way that the sensors respond upon the approach to position indicating elements and transmit signals to a transmission control corresponding to the pivoted position of the selector lever.

U.S. Pat. No. 5,406,860 describes a transmission selector lever arrangement with a lever supported in bearings in a housing which can be pivoted in longitudinal and transverse direction within a guide slot, that is provided with a main slot and three subordinate slots parallel to the main slot and connected by transverse slots with the main slot. A sector component is supported in bearings, free to pivot, between a housing wall and the lever and is forced by a spring into a central position. By pivoting the lever within a transverse slot in the direction of a subordinate slot, the lever can be brought into engagement with the sector component so that both can be pivoted together in the longitudinal direction, as long as the particular subordinate slot permits. The lever and the sector component each carry a magnet. Hall effect sensors are arranged at the housing wall in such a way that when the lever is pivoted within a subordinate slot and upon the approach of the magnets to the Hall effect sensors, signals are generated that in each case correspond to the position of the lever. The sensor signals, in particular, can be used to determine in which subordinate slot the lever is located and which position it occupies within the subordinate slot. The known arrangement of the magnets and sensors, however, does not permit the detection of varying lever positions within any configuration of guide slots.

The object of the invention is seen as that of defining a shift mechanism of the aforementioned type that permits an automatic detection of the position of the selector lever in the longitudinal and transverse direction during any desired movement of the selector lever in the longitudinal or transverse direction.

According to the invention, the position indicating elements and the sensors are arranged in essentially two planes that are oriented approximately parallel to the planes that are defined, on the one hand by the pivoting path in the longitudinal direction, and on the other hand by the pivoting path in the transverse direction. This makes it possible to detect the position of the selector lever in the longitudinal direction as well as in the transverse direction. By a corresponding arrangement of position indicating elements on the one hand, and of sensors on the other hand, any desired position of the selector lever can be selected for a detection of the position in both directions of movement.

A preferred embodiment of the invention provides for the provision in the housing of a pivoting component that can be pivoted longitudinally about a transverse axle fixed to the housing. The pivoting component, in turn, contains a longitudinal axle about which the selector lever can be pivoted. Thereby the selector lever can be pivoted together with the pivoting component in the longitudinal direction and be pivoted relative to the pivoting component in the transverse direction.

Since thereby the pivoting component moves within a fixed pivoting path, that is defined by the transverse axle, a spacing from a housing wall extending perpendicular to the transverse axle remains constant. Thereby a constant spacing between the plane of the position indicating elements and the plane of the sensors can be maintained. Here there is a particular advantage in fastening at least one magnet to the pivoting component and to arrange at least one sensor in the region of the opposite housing wall in such a way that upon pivoting the pivoting component, the magnet enters the detection region of the sensor. The sensors applied here are preferably Hall effect sensors. In principle it would also be possible to fasten the Hall effect sensors to the pivoting component and the magnets as stationary parts to the housing, however, the routing of electrical lines to the stationary Hall effect sensors is simpler.

In order to be able to continuously detect the rotational position of the selector lever in the longitudinal direction, a preferred further development of the invention proposes that the rotational position of the selector lever be transmitted to a rotational transmitter. This can be performed, for example, by fastening a gear or a gear segment to the pivoting component which interacts with a further gear or gear segment, where the further gear or gear segment is connected by a shaft to a rotational transmitter. By appropriate dimensioning of the pitch circles of the gears a desired transmission ratio between the selector lever and the rotational transmitter can be achieved.

The application of a rotational transmitter is particularly advantageous if the shift mechanism is to be employed to transmit control signals for a vehicle drive with an infinitely variable transmission. Here, for example, the transmission ratio of the drive can be provided as input analogous to the position of the selector lever 14, which is detected by the rotational transmitter.

Preferably the rotational transmitter employed may be a non-contacting transmission, for example, a continuous rotational sensor with Hall effect element such as is offered, for example, by the company AB Electronics.

It is desirable that the operator feel at what point certain lever positions are reached or passed while the selector lever is being pivoted. For this purpose a preferred embodiment of the invention suggests that the pivoting components or the selector lever carry detent means that interact with detent elements formed fixed to the housing or on the pivoting component, in order to define detent positions during the pivoting of the selector lever in the longitudinal direction or in the transverse direction.

There is a particular advantage in the shift mechanism that can be applied to various applications, for example, for selector levers guided in different guide slots, where in any case minor, simple compliance measures must be taken. This permits the manufacture of shift mechanisms in relatively large volume and permits a reduction in manufacturing cost and a rational supply system. In order to attain these goals a preferred embodiment of the invention proposes that the detent elements fixed to the housing and/or the detent elements arranged on the pivoting component be configured on components that can be fastened to or interchanged with the housing or the pivoting component. Such components may, for example, be interchangeable plates with a detent scheme, for example, with one or more recesses in which a ball of the detent means engages. By means of the interchangeable longitudinal and transverse detents, a universally useful shift mechanism, also called shift unit, can be attained.

The detent means is preferably a ball pressure element, whose ball interacts with a detent element configured as a cam surface that may, for example, contain recesses and/or projections. The ball pressure element contains a spring-loaded ball, that can be depressed.

According to a preferred further embodiment of the invention, the housing contains a support component supported in bearings that can be pivoted about a longitudinal axle fixed to the housing which participates in the transverse pivoting movement of the selector lever relative to a driver. The support component carries at least one position indicating element, in particular a magnet, which intrudes during the pivoting of the support component into the detection region of at least one sensor fixed to the housing, preferably a Hall effect sensor.

A simple, preferred configuration of the driver is provided by a fork-shaped receptacle on the support component that engages a strap of the selector lever extending in the direction of the transverse axle which can be slid within the receptacle. This permits a pivoting of the selector lever in the longitudinal direction in which the strap is shifted in longitudinal direction within the fork-shaped receptacle, without any pivoting motion of the support component. However, if the selector lever is moved in transverse direction, the strap transmits the pivoting motion to the support component, and pivots this along with the selector lever.

A further particularly preferred embodiment of the invention, that makes it possible for the shift mechanism to comply with different applications, provides for at least one adapter element, that can be fastened to the housing and is interchangeable, on which at least one sensor is arranged, in particular a Hall effect sensor. For the particular applications in each case adapter elements can be employed, that are equipped variously, with differing sensor arrangements. The adapter elements can be mounted very simply on the housing, for example, by bolting or by engaging detents, and are easily interchangeable.

Preferably the adapter element may be configured as a circuit board or an integrated circuit, that carries further electrical components in addition to the sensors, for example, for the processing of sensor signals.

BRIEF DESCRIPTION OF THE DRAWINGS

The drawing shows an embodiment of the invention on the basis of which the invention as well as further advantages and advantageous further developments and embodiments of the invention shall be explained and described in greater detail in the following.

DETAILED DESCRIPTION OF THE PREFERRED EMBODIMENTS

Figure 1:
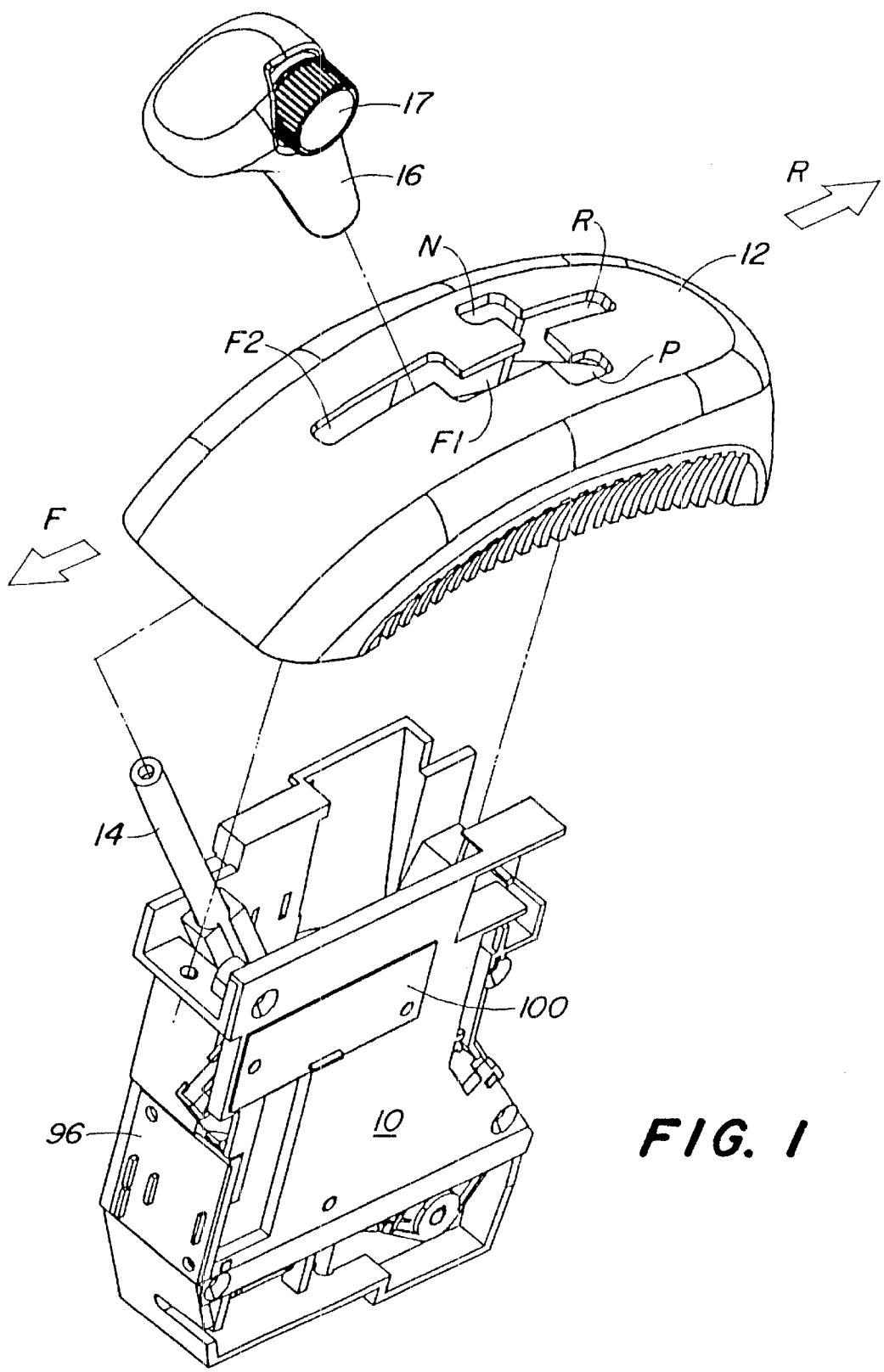
FIG. 1 shows a perspective view of a shift mechanism according to the invention, in which housing, guiding gate and shift knob are illustrated separately.
Figure 2:
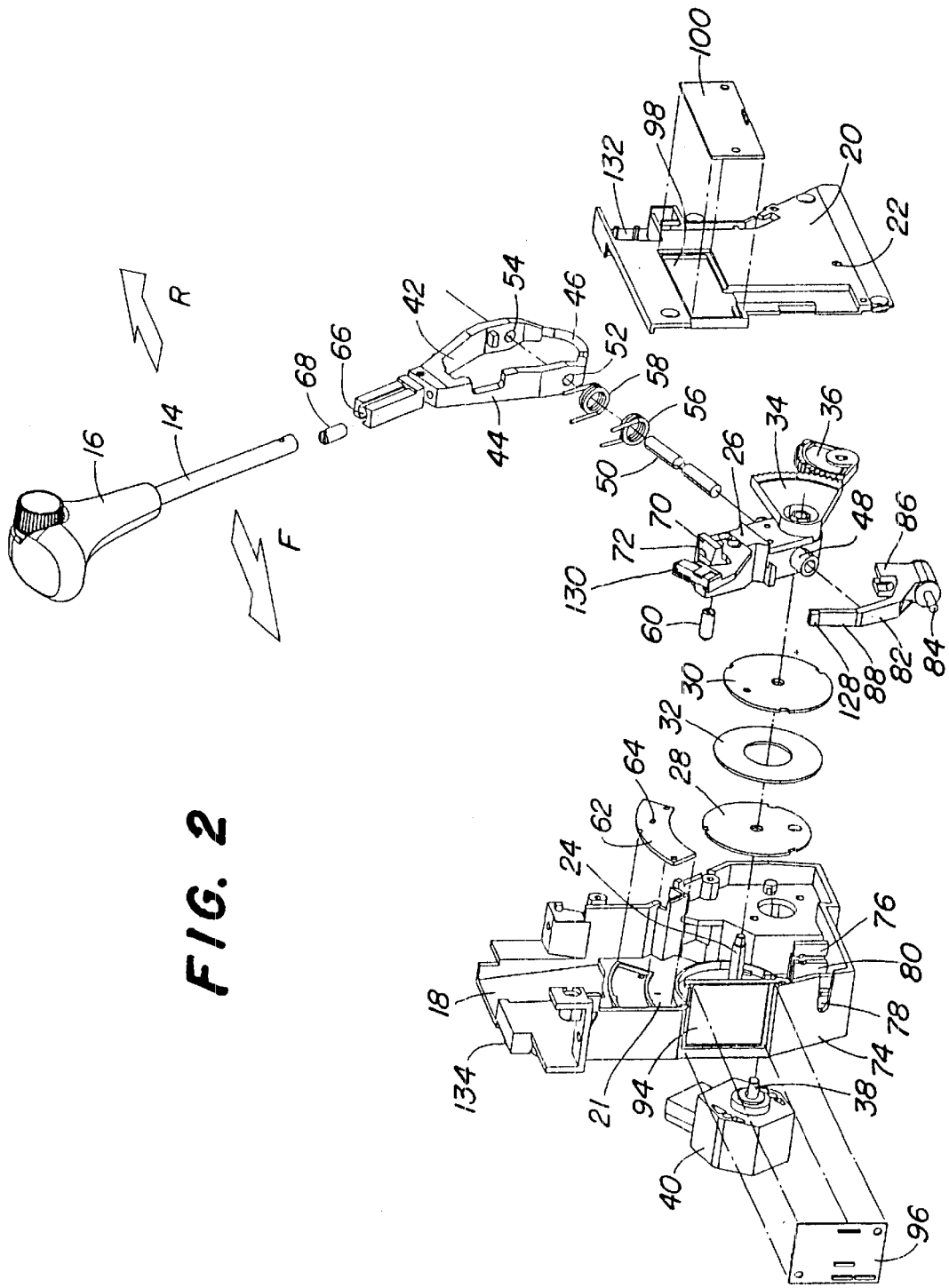
FIG. 2 shows an exploded view of a shift mechanism according to FIG. 1.

The shift mechanism shown in FIGS. 1 and 2 generally contains a housing 10, a guide gate 12 that covers the top of the housing and a selector lever 14 at whose free end extending upward through the guide gate 12, out of the housing 10, a shift knob 16 is fastened that can be operated by an operator and includes a control head 17, not explained here in any greater detail. The housing 10 contains a base housing 18 and a side cover plate 20, (shown in FIG. 2) that can be bolted to the base housing 18 and through which the base housing 18 can be closed at the side. A transverse axle 24 is supported in bearings on an end face wall 21 of the base housing 18 and on the side cover plate 20 located opposite at a bearing location 22. A pivoting component 26, also called a quadrant, is supported in bearings, free to pivot on the transverse axle 24. On the transverse, axle 24, between the pivoting component 26 and the end face wall 21 of the base housing 18, two steel disks 28, 30 and a friction disk 32, located between them, are arranged. These represent a friction clutch that restricts the pivoting motion of the pivoting component 26 in the longitudinal direction, so that the pivoting component 26, and with it the selector lever 14, remains in its immediate longitudinal position as long as no force is applied to move it.

A first gear segment 34 is fastened to the pivoting component 26, its axis of rotation coincides with the transverse axle 24. The first gear segment 34 meshes with a second gear segment 36, which is connected, fixed against rotation, to the input shaft 38 of a rotational transmitter 40. Thereby the pivoting motion of the pivoting component 26 is transmitted to the rotational transmitter 40. The rotational transmitter 40 is a non-contacting rotational transmitter that rotates continuously and contains Hall effect sensors. The rotational transmitter signals correspond to the immediate pivoted position of the selector lever 14 in the longitudinal direction and are transmitted to a transmission control arrangement, not shown in any greater detail.

A recess of the pivoted component 26, not shown in any greater detail, engages a detent means that consists of a ball pressure element 60 and is oriented parallel to the transverse axle 24. The ball pressure element 60 generally contains a sleeve within which a compression spring is arranged which forces a ball axially outward. Opposite the ball an interchangeable detent plate 62 is fastened to the end face wall 21 of the base housing 18, which in the present embodiment is provided with only one detent bore 64. At a certain pivoted position of the selector lever 14 in the longitudinal direction (and with it the pivoted component 26) the ball of the ball pressure element 60 engages the detent bore 64 and forms a detent position, that can be felt by the operator during the pivoting of the selector lever 14. By the use of differing detent plates 62, with differing numbers and positions of detent bores, various differing detent positions for the longitudinal pivoting movement of the selector lever 14 can be established, without significant cost.

The lower region of the selector lever 14, that extends away from the shift knob 16, extends in two legs 42, 44 spaced at a distance from each other, whose lower, free ends are connected to each other by a strap 46 or a fork. When the shift mechanism is installed, the pivoting component 26 is located in the region between the two legs 42, 44. A longitudinal bore 48 of the pivoting component 26 engages a longitudinal axle 50, whose both ends engage bores 52, 54 in the two legs 42, 44, so that the selector lever 14 is supported on the pivoting component 26 and can be pivoted in the transverse direction with respect to the pivoting component 26. Furthermore two helical springs 56, 58 are provided that force the pivoting component 26 to the left when viewed looking forward, that is, into its park position.

A detent in the form of a ball pressure element 68 is inserted into an axial bore 66 of the selector lever 14, the detent is configured similar to the ball pressure element 60 previously described. The ball of the ball pressure element 68 projects into the space between the two legs 42, 44 and interacts with a detent surface 70 of the pivoting component 26. A detent projection 72 projecting upward, shown as a line, oriented parallel to the longitudinal axle 50 extends over the detent surface 70. For the ball pressure element 68 the detent projection 72 forms an obstacle that can be overcome, through which the operator feels during the pivoting of the selector lever 14 in the transverse direction when a certain lever position is traversed. This simplifies the operation of the selector lever 14. The detent surface 70 is developed on an interchangeable component that is fastened to the pivoting component 26. By the use of various interchangeable components, with variously configured transverse directed detent projections, raised contours, humps, ramps or recesses, various tactile obstacles can be provided by very simple means. Thereby it is possible to conform to any desired requirement that can be provided, this can be accomplished without any particular expense and without the necessity of a fundamental modification of the shift unit.

In a side wall 74 and in an intermediate wall 76 of the base housing 18, bearing locations 78, 80 are provided in which a support component 82 with its rotational axle 84, fixed to the housing, is supported in bearing, free to pivot. The support component 82 is provided with a fork-shaped receptacle 86 that is open upward and extends in the transverse direction, which engages the strap 46 of the selector lever 14. During the pivoting of the selector lever 14 in the transverse direction about the longitudinal axle 50, the pivoting movement is transmitted over the strap 46 and the receptacle 86 to the support component 82, so that this is pivoted about the longitudinal axle 84, fixed to the housing. When the selector lever 14 is pivoted in the longitudinal direction about the transverse axle 24, the strap 46 slides in its longitudinal direction within the receptacle 86 without pivoting the support component 82.

The guide gate 12 shown in FIG. 1 contains a slot in which the selector lever 14 is guided. The slot contains a neutral channel extending in the transverse direction that connects a neutral position N with a park position P. From the neutral channel, a first forward channel F1 extending in longitudinal direction branches off. Offset from the first forward channel and in the opposite direction from the neutral channel, a reverse channel R branches off and extends in the longitudinal direction. The first forward channel F1 jogs into a second forward channel F2 offset therefrom and also extending in the longitudinal direction. When the selector lever 14 is moved within the forward channels F1 and F2 and the reverse channel R, the rotational transmitter 40 is rotated and transmits corresponding signals to a transmission control arrangement in order to control the vehicle speed corresponding to the position of the selector lever.

Figure 3:
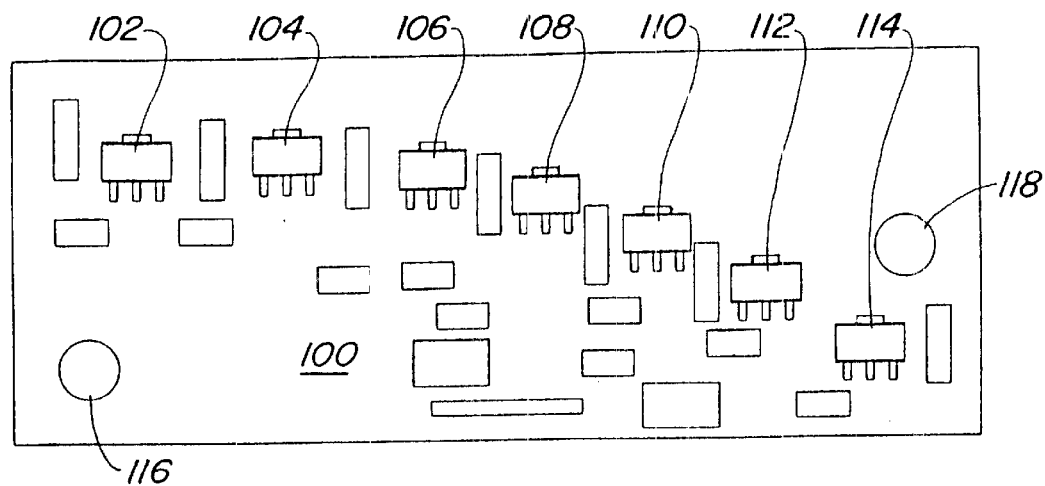
FIG. 3 shows a circuit board with Hall effect sensors for the detection of the shift lever position in the longitudinal direction.
Figure 4:
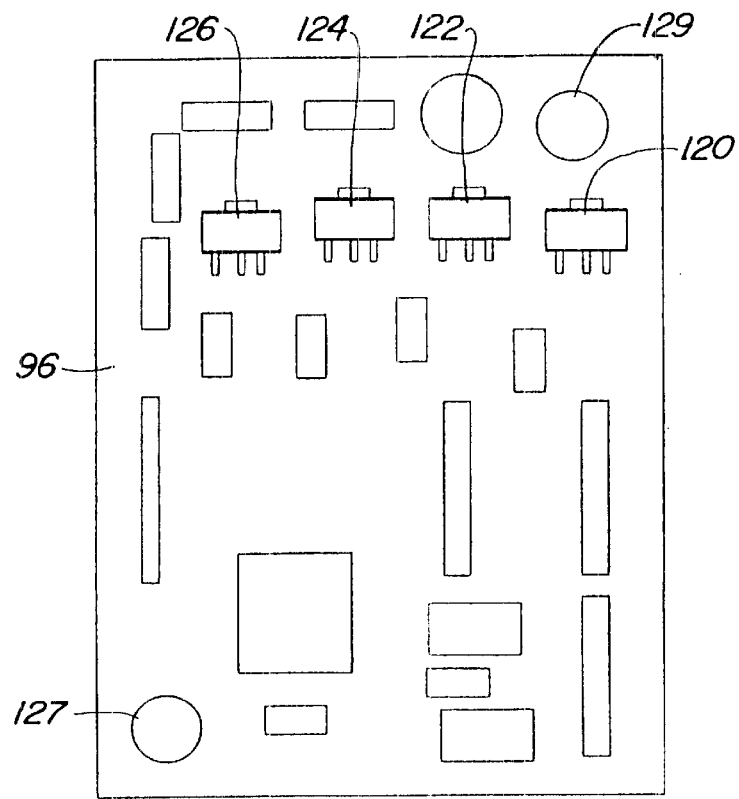
FIG. 4 shows a circuit board with Hall effect sensors for the detection of the shift lever position in the transverse direction.

An opening 94 in the side wall 74 of the base housing 18 can be closed by a first integrated circuit 96. An opening 98 in the cover plate 20 can be closed by a second integrated circuit 100. FIGS. 3 and 4 show the two integrated circuits 96, 100 from the interior of the housing. As can be seen in FIG. 3, on the second integrated circuit 100 seven Hall effect sensors 102, 104, 106, 108, 110, 112, 114 are arranged in an arc. Two fastening holes 116, 118 are used for the mounting on the cover plate 20. According to FIG. 4, on the first integrated circuit 96 four Hall effect sensors 120, 122, 124, 126 are arranged in an arc. Here too, two fastening holes 127, 129 are provided that are used for the fastening on the side wall 74. Both integrated circuits 96, 100 are equipped with further electrical components that are indicated in FIGS. 3 and 4 as rectangles, but are not described in any further detail. These are resistors, voltage regulators, integrated electronic components and the like which are used for signal processing for the Hall effect sensors 102–114 and 120–126.

The support component 82 carries an extension arm 88 that extends generally upward at whose upper end a position indicating element such as a permanent magnet 128 is fastened. When the support component 82 is pivoted, the permanent magnet 128 moves parallel to the surface of the first integrated circuit 96 along an arc on which the Hall effect sensors 120, 122, 124, 126 of the first integrated circuit 96 are arranged. When the selector lever 14 is pivoted in the transverse direction, the magnetic field of the permanent magnet 128 is detected successively in each case by one of the Hall effect sensors 120, 122, 124, 126 so that these transmit control signals to a transmission control arrangement corresponding to the position of the selector lever 14. When the selector lever 14 is in the neutral position N the Hall effect sensor 120 responds to the magnetic field of the permanent magnet 128, when the reverse channel R is reached the Hall effect sensor 122 responds, when the first forward channel F1 is reached the Hall effect sensor 124 responds and when the selector lever is in the park position P then the Hall effect sensor 126 responds.

The pivoting component 26 also carries a position indicating element such as a permanent magnet 130 in its upper region. When the pivoting component 26 is pivoted the permanent magnet 130 moves parallel to the surface of the second integrated circuit 100 along an arc on which the Hall effect sensors 102, 104, 106, 108, 110, 112, 114 of the second integrated circuit 100 are arranged. When the selector lever 14 is pivoted in the longitudinal direction, the magnetic field of the permanent magnet 130 is detected successively in each case by one or more of the Hall effect sensors 102, 104, 106, 108, 110, 112, 114 so that these transmit control signals to a transmission control arrangement corresponding to the position of the selector lever 14. The control signals of the Hall effect sensors 102, 104, 106, 108, 110, 112, 114 reveal, for example, whether the selector lever 14 is located in the end position of the reverse channel R, the park position P, the neutral channel, the neutral position N, in the transition region between the first and the second forward channels F1 and F2 or the end position of the second forward channel F2.

A micro-switch can be mounted at the location 132 of the cover plate 20, whose trigger element lies in the pivoting path of the selector lever 14 and responds when the park position P is reached. Furthermore a micro-switch can be mounted at the location 134 of the base housing 18, whose trigger element also lies in the pivoting path of the selector lever 14 and responds when the neutral position N is reached. The signals of the micro-switches are transmitted to a transmission control arrangement, not shown, and evaluated there.

The shift unit shown with the integrated shift elements for the pre-selection of the vehicle speed as well as an actuation device for manual throttle control (rotational transmitter 40), is a group of components for the manual, infinitely variable shifting of an infinitely variable transmission under load in agricultural tractors.

Although the invention has been described in terms of only one embodiment, anyone skilled in the art will perceive many varied alternatives, modifications and variations in the light of the above description as well as the drawing all of which fall under the present invention.

We claim:

1. A shift mechanism for motor vehicle transmissions comprising:
   a selector lever (14) supported in a housing (10) for pivotal motion about a transverse axle (24) in a longitudinal direction and about a longitudinal axle (50) in a transverse direction;
   position indicating elements (128, 130) either movable with the selector lever or fixed to the housing and sensors (102–114, 120–126) either movable with the selector lever or fixed to the housing opposite the position indicating elements with the position indicating elements and the sensors arranged in such a way that the sensors (102–114, 120–126) respond upon approaching the position indicating elements (128, 130) and transmit signals to a transmission control arrangement that correspond to the pivoted position of the selector lever (14) wherein the position indicating elements (128, 130) and the sensors (102–114, 120–126) are generally arranged in planes and extend approximately parallel to the planes established on the one hand by the pivoting path of the selector lever in the longitudinal direction and on the other hand by the pivoting path of the selector lever in the transverse direction; and
   a rotational transmitter (40) operatively coupled to the selector lever (14) to rotate therewith as the selector lever (14) rotates in the longitudinal direction and generate a signal corresponding to the immediate pivoted position of the selector lever (14).

2. The shift mechanism according to claim 1 further comprising a pivoting component (26) supported in bearings in the housing (10) for pivotal motion about the transverse axle (24), the pivoting component (26) having the longitudinal axle (50) about which the selector lever (14) can be pivoted.

3. The shift mechanism according to claim 2 wherein at least one of the position indicating elements (128, 130) is carried by the pivoting component (26) which upon pivoting of the pivoting component (26) enters the detection region of at least one sensor (102–114, 120–126) fixed to the housing.

4. The shift mechanism according to claim 3 wherein the at least one of the position indicating elements (128, 130) is a permanent magnet and the at least one sensor (102–114, 120–126) is a Hall effect sensor.

5. The shift mechanism according to claim 2 wherein the pivoting component (26) carries at least one detent means (60) that interacts with at least one detent element (64) fixed to the housing in order to define detent positions upon pivoting of the selector lever (14) in the longitudinal direction.

6. The shift mechanism according to claim 5 wherein the at least one detent element (64) fixed to the housing is provided on an interchangeable component (62) that can be fastened to the housing.

7. The shift mechanism according claim 2 wherein the selector lever (14) carries at least one detent means (68), that interacts with at least one detent element (72) carried by the pivoting component (26) in order to define detent positions upon the pivoting of the selector lever (14) in the transverse direction.

8. The shift mechanism according to claim 7 wherein the at least one detent element (72) carried by the pivoting component (26) is provided on an interchangeable component (70) that can be fastened to the pivoting component (26).

9. The shift mechanism according to claim 1 wherein the rotational transmitter that is a non-contacting rotational transmitter (40).

10. The shift mechanism according to claim 9 wherein the non-contacting rotational transmitter (40) includes a Hall effect sensor.

11. The shift mechanism according to claim 1 characterized by a support component (82) mounted to the housing (10) for pivotal movement about a longitudinal axle (84) which coordinates with the transverse pivoting movement of the selector lever (14) through a driver (86) and which carries at least one position indicating element (128), which upon the pivoting of the support component (82) penetrates the detection region of at least one sensor (120–126).

12. The shift mechanism according to claim 11 wherein the support component (82) is provided with a fork-shaped receptacle (86) that engages an elongated strap portion (46) of the selector lever (14) that can be moved within the receptacle (86) and which is oriented lengthwise in the direction of the longitudinal axle (50).

13. The shift mechanism according to claim 1 further comprising at least one adapter element (96, 100) that is interchangeable and can be fastened to the housing (10) and on which at least one of the sensors (102–114, 120–126) is arranged.

14. The shift mechanism according to claim 13 wherein the adapter element that is configured as a circuit board (96, 100) that carries, in addition to the sensors (102–114, 120–126), further electrical components for the processing of the sensor signals.

* * * * *